(12) United States Patent
Kim et al.

(10) Patent No.: US 10,988,398 B2
(45) Date of Patent: Apr. 27, 2021

(54) MOLDING MATERIAL FOR 3D PRINTING BASED ON CRUSHED AMORPHOUS GLASS HAVING IRREGULAR SHAPE, MOLDING METHOD FOR 3D PRINTING, AND MOLDED BODY

(71) Applicant: INHA UNIVERSITY RESEARCH AND BUSINESS FOUNDATION, Incheon (KR)

(72) Inventors: Hyungsun Kim, Incheon (KR); Daeyong Jeong, Seoul (KR); Sunghwan Cho, Jecheon-si (KR); Yeongjun Seo, Chungju-si (KR)

(73) Assignee: Inha University Research and Business Foundation, Incheon (KR)

( * ) Notice: Subject to any disclaimer, the term of this patent is extended or adjusted under 35 U.S.C. 154(b) by 493 days.

(21) Appl. No.: 15/744,202

(22) PCT Filed: Dec. 31, 2015

(86) PCT No.: PCT/KR2015/014572
§ 371 (c)(1),
(2) Date: Jan. 12, 2018

(87) PCT Pub. No.: WO2017/026601
PCT Pub. Date: Feb. 16, 2017

(65) Prior Publication Data
US 2018/0194662 A1    Jul. 12, 2018

(30) Foreign Application Priority Data
Aug. 12, 2015 (KR) .......................... 10-2015-0113820

(51) Int. Cl.
*C03B 19/01* (2006.01)
*C03B 19/06* (2006.01)
(Continued)

(52) U.S. Cl.
CPC .............. *C03B 19/01* (2013.01); *C03B 19/06* (2013.01); *C03C 3/04* (2013.01); *C03C 3/122* (2013.01);
(Continued)

(58) Field of Classification Search
None
See application file for complete search history.

(56) References Cited

U.S. PATENT DOCUMENTS

| 2008/0044488 A1* | 2/2008 | Zimmer | ................. B82Y 30/00 424/600 |
| 2016/0200045 A1* | 7/2016 | Hopkins | ................. B22F 7/008 428/550 |

FOREIGN PATENT DOCUMENTS

| JP | 2005/194120 | * | 1/2004 | ............ C03C 3/064 |
| JP | 2005-194120 A | | 7/2005 | |

(Continued)

OTHER PUBLICATIONS

JP-2005/194,120 (Keisuke) Jan. 2004 (online machine translation), [Retrieved on Mar. 25, 2020], Retrieved from: Espacenet (Year: 2004).*
(Continued)

*Primary Examiner* — Alison L Hindenlang
*Assistant Examiner* — Andrés E. Behrens, Jr.
(74) *Attorney, Agent, or Firm* — Rabin & Berdo, P.C.

(57) ABSTRACT

The present invention relates to a forming material for three-dimensional (3D) printing, a forming method for 3D printing, and a formed object, wherein, while being based on an amorphous glass powder shaped irregularly, the forming material for 3D printing ensures excellent flowability and sinterability such that it enables the formation of high-quality products at high speed. The forming material for 3D printing consists of a parent glass powder in the form of an
(Continued)

unmelted powder irregularly shaped by crushing amorphous glass; and a spherical nanopowder that has an average particle diameter equal to or less than $\frac{1}{50}^{th}$ of the average particle diameter of the parent glass powder and is mixed in such a way that it can be disposed on a surface of the parent glass powder to enhance the flowability of the irregularly shaped parent glass powder during the formation of an object by 3D printing.

11 Claims, 14 Drawing Sheets

(51) Int. Cl.
    *C03C 8/02*     (2006.01)
    *C03C 12/00*     (2006.01)
    *C03C 3/04*     (2006.01)
    *C03C 3/16*     (2006.01)
    *B33Y 70/00*     (2020.01)
    *C03C 14/00*     (2006.01)
    *C03C 3/12*     (2006.01)
    *B82Y 30/00*     (2011.01)

(52) U.S. Cl.
    CPC .................. *C03C 3/16* (2013.01); *C03C 8/02* (2013.01); *C03C 12/00* (2013.01); *C03C 14/004* (2013.01); *B33Y 70/00* (2014.12); *B82Y 30/00* (2013.01); *C03C 2214/30* (2013.01)

(56) References Cited

FOREIGN PATENT DOCUMENTS

| KR | 10-2008-0048755 A | 6/2008 |
| KR | 10-2012-0097945 A | 9/2012 |
| KR | 10-2013-0081430 A | 7/2013 |
| KR | 10-1374232 B1 | 3/2014 |

OTHER PUBLICATIONS

JP-2005/194120 (Mori) Jun. 2004 (online machine translation), [Retrieved on May 28, 2020], Retrieved from: Espacenet (Year: 2004).*

Funk J.E., Dinger D.R. (1994) Fundamentals of Particle Packing, Monodisperse Spheres. In: Predictive Process Control of Crowded Particulate Suspensions. Springer, Boston, MA (Year: 1994).*

"Triboelectric Effect." Wikipedia, the Free Encyclopedia, Wikipedia, Apr. 10, 2015, web.archive.org/web/20150410214647/en.wikipedia.org/wiki/Triboelectric_effect. (Year: 2015).*

"List of Inorganic Pigments." Wikipedia, Wikimedia Foundation, Jun. 10, 2015, web.archive.org/web/20151015000000*/en.wikipedia.org/wiki/List_of_inorganic_pigments. (Year: 2015).*

* cited by examiner

US 10,988,398 B2

MOLDING MATERIAL FOR 3D PRINTING BASED ON CRUSHED AMORPHOUS GLASS HAVING IRREGULAR SHAPE, MOLDING METHOD FOR 3D PRINTING, AND MOLDED BODY

TECHNICAL FIELD

The present invention relates to a three-dimensional (3D) printing technique, and, more particularly, to a forming material for 3D printing, a forming method for 3D printing, and a formed object, wherein, while being based on an amorphous glass powder shaped irregularly through crushing, the forming material for 3D printing ensures excellent flowability and sinterability such that it enables the formation of high-quality products at high speed.

BACKGROUND ART

In general, three-dimensional (3D) printing techniques are methods for preparing a 3D structure by accumulating very thin layers of an ink based on a special substance. The use of 3D printing techniques has been broadened in various fields, and, besides in the automotive field where a number of parts are involved, such techniques are widely used to prepare anatomical models for medical use or various models for household products, such as toothbrushes and razors, or the like.

Currently, the materials most commonly used for 3D printing are photopolymers, which are polymeric materials that cure when exposed to light and occupy 50% or more of the total market. The second most-popular materials are thermoplastics, which are in the form of a solid that freely melts and solidifies and occupy about 40% of the market, and the share of the market for metal powders is also expected to gradually grow in the future. Among these, the thermoplastics may take the form of a filament, a particle, or a powder. The use of a filament-type material for 3D printing is known to have a benefit of high productivity that results from high speed as compared to other types of materials. Such filament-type materials include a polylactic acid (PLA), an acrylonitrile butadiene styrene (ABS), a high density polyethylene (HDPE), a polycarbonate (PC), and the like, and they are used for the following reasons. First, since their melting points are suitably high, the materials solidify rapidly after printing such that the materials do not deform even when printed at high speed and have high stability in terms of size and shape. Second, the melting points are suitably low such that extrusion is easy and the production efficiency is high during the preparation of filaments. Excessively high melting points result in an unnecessary increase in costs for such reasons as excessive power consumption for melting filaments and a need to make parts of a printer out of materials that can tolerate high temperatures.

However, since the 3D printing materials currently in use are limited to photopolymers or thermoplastics focused mainly on formability, there is an urgent need for the research and development of more various materials. In particular, there is a need for the development of 3D printing materials that are capable of combining various mechanical properties while being capable of easily forming 3D printing products and having the transmittance and hardness that are difficult to realize with photopolymers or thermoplastics.

DISCLOSURE

Technical Problem

Hence, the present invention was proposed to solve the aforementioned problems of the conventional art. The present invention relates to a 3D printing technique, and, more particularly, the present invention is directed to providing a forming material for 3D printing that ensures excellent flowability and sinterability such that it enables the formation of high-quality articles at high speed while being based on an amorphous glass powder shaped irregularly through crushing, a forming method for 3D printing, and a formed object.

Technical Solution

In order to achieve the aforementioned objectives, the forming material for three-dimensional (3D) printing according to the technical scope of the present invention consists of a parent glass powder in the form of an unmelted powder irregularly shaped by crushing amorphous glass; and a spherical nanopowder that has an average particle diameter equal to or less than $1/50^{th}$ of the average particle diameter of the parent glass powder and is mixed in such a way that it can be disposed on a surface of the parent glass powder to enhance the flowability of the irregularly shaped parent glass powder during the formation of an object by 3D printing.

Here, the parent glass powder material belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component.

Also, the average particle diameter of the parent glass powder is in a range of 1 to 200 μm, and the average particle diameter of the spherical nanopowder is 100 nm or less.

In addition, the ratio of the average particle diameter of the spherical nanopowder to the parent glass powder is in a range of $1/200000$ to $1/50$.

Moreover, the parent glass powder is obtained by a method of crushing glass for the first time by ball milling to form coarse particles and then crushing the coarse particles for the second time by jet milling or ball milling to form fine particles.

Further, the spherical nanopowder material belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component, or contains $SiO_2$, $Y_2O_3$, $Al_2O_3$, $TiO_2$, ZrO, NiO, CoO, $CeO_2$, MgO, CaO, $WO_3$, CuO, or $Fe_2O_3$ as the main component.

Furthermore, the spherical nanopowder is configured to have a glass transition temperature that is lower than the glass transition temperature of the parent glass powder such that it can promote the sintering of the parent glass powder.

Also, the spherical nanopowder material is multicomponent oxide glass that belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component.

In addition, the average particle diameter of the parent glass powder is in a range of 1 to 200 μm, and the average particle diameter of the spherical nanopowder is 10 nm or less.

Moreover, the spherical nanopowder can also enhance the forming strength of the parent glass powder by containing a mixture of the above multicomponent oxide glass and a single oxide that is based on any one of $SiO_2$, $Y_2O_3$, $Al_2O_3$, $TiO_2$, ZrO, NiO, CoO, $CeO_2$, MgO, CaO, $WO_3$, CuO, and $Fe_2O_3$ and has an average particle diameter of 100 nm or less.

Further, the spherical nanopowder can enhance the flowability and forming strength of the parent glass powder by being based on any one of single oxides that do not react with the parent glass powder during the sintering of the parent glass powder.

Furthermore, the spherical nanopowder is a single oxide that is based on any one of $SiO_2$, $Y_2O_3$, $Al_2O_3$, $TiO_2$, ZrO, NiO, CoO, $CeO_2$, MgO, CaO, $WO_3$, CuO, and $Fe_2O_3$ and has an average particle diameter of 100 nm or less.

Also, due to heat and static electricity, the spherical nanopowder is coated, in a dispersed state, on a surface of the parent glass powder.

In addition, during the sintering process, the sintering of the formed object is performed at a temperature in a range between the maximum-shrinkage temperature and the softening temperature of the parent glass powder.

Moreover, the spherical nanopowder is mixed in a ratio in a range of 0.01 vol. % to 1 vol. % of the total materials.

In the meantime, the forming method of the present invention for 3D printing includes a crushing process that crushes amorphous glass to prepare a parent glass powder in the form of an unmelted powder irregularly shaped; a mixing process that adds a spherical nanopowder having an average particle diameter equal to or less than $\frac{1}{50}^{th}$ of the average particle diameter of the parent glass powder as a flowability enhancer that improves the flowability of the parent glass powder; a forming process that forms a 3D formed object based on a powder mixture containing a mixture of the parent glass powder and the spherical nanopowder; and a sintering process that sinters the formed object prepared through the forming process.

Here, the crushing process includes the first crushing of glass by ball milling that forms coarse particles and the second crushing of the coarse particles by jet milling or ball milling that forms fine particles, which are performed in sequence to prepare the parent glass powder.

Also, the amorphous glass before crushing is in the form of thin cullets prepared by pouring a glass material melt on a ribbon roller.

In addition, during the mixing process, the spherical nanopowder is coated, in a dispersed state, on a surface of the parent glass powder.

Moreover, the parent glass powder and the spherical glass powder are mixed by dry mixing.

Further, a drying process that dries the formed object and a powder cleaning process that removes residual powder particles accumulated on the formed object are carried out between the forming process and the sintering process.

Furthermore, a binder removal process that removes the binder used for the forming process by burning the same is carried out between the forming process and the sintering process, and the binder is removed at a temperature lower than the glass transition temperature of the parent glass powder.

Also, the spherical nanopowder is configured to have a glass transition temperature that is lower than the glass transition temperature of the parent glass powder such that it can promote the sintering of the parent glass powder.

In the meantime, the method of forming a 3D formed object of the present invention that mimics the integumentary system of a living body technically forms a plurality of pores during the forming process in pursuit of light transmittance and a light weight.

Here, the formed object is formed to have a multilayer structure, wherein at least one layer is formed as a porous layer containing a plurality of pores and at least one layer, including the layer adjacent to the porous layer, is formed as a fibrous layer in which linear structural units are overlapped.

Also, the linear structural units are laid across each other at least partly.

In addition, the linear structural units in the fibrous layer are formed in such a way that they are overlapped, partly forming fine gaps among one another.

Moreover, a layer adjacent to at least one of the fibrous layer and the porous layer is formed into a scaled layer in which plate-like structural units are partly overlapped in the form of scales.

Further, the formed object of the present invention is a 3D formed object that mimics the integumentary system of a living body, is formed out of the aforementioned forming material for 3D printing, and technically has light transmittance and a light weight by including a plurality of pores.

Here, the formed object has a multilayer structure, wherein at least one layer is a porous layer containing a plurality of pores and at least one layer other than the porous layer(s) is a fibrous layer formed into a structure in which linear structural units are overlapped.

Advantageous Effects

The forming material for three-dimensional (3D) printing and the forming method for 3D printing according to the present invention are capable of realizing a forming material for 3D printing that ensures excellent flowability while being based on an amorphous glass powder shaped irregularly through crushing.

In addition, besides offering excellent flowability, the present invention is capable of forming high-quality articles at a high speed by enhancing the sinterability and the forming strength.

Figure 1:
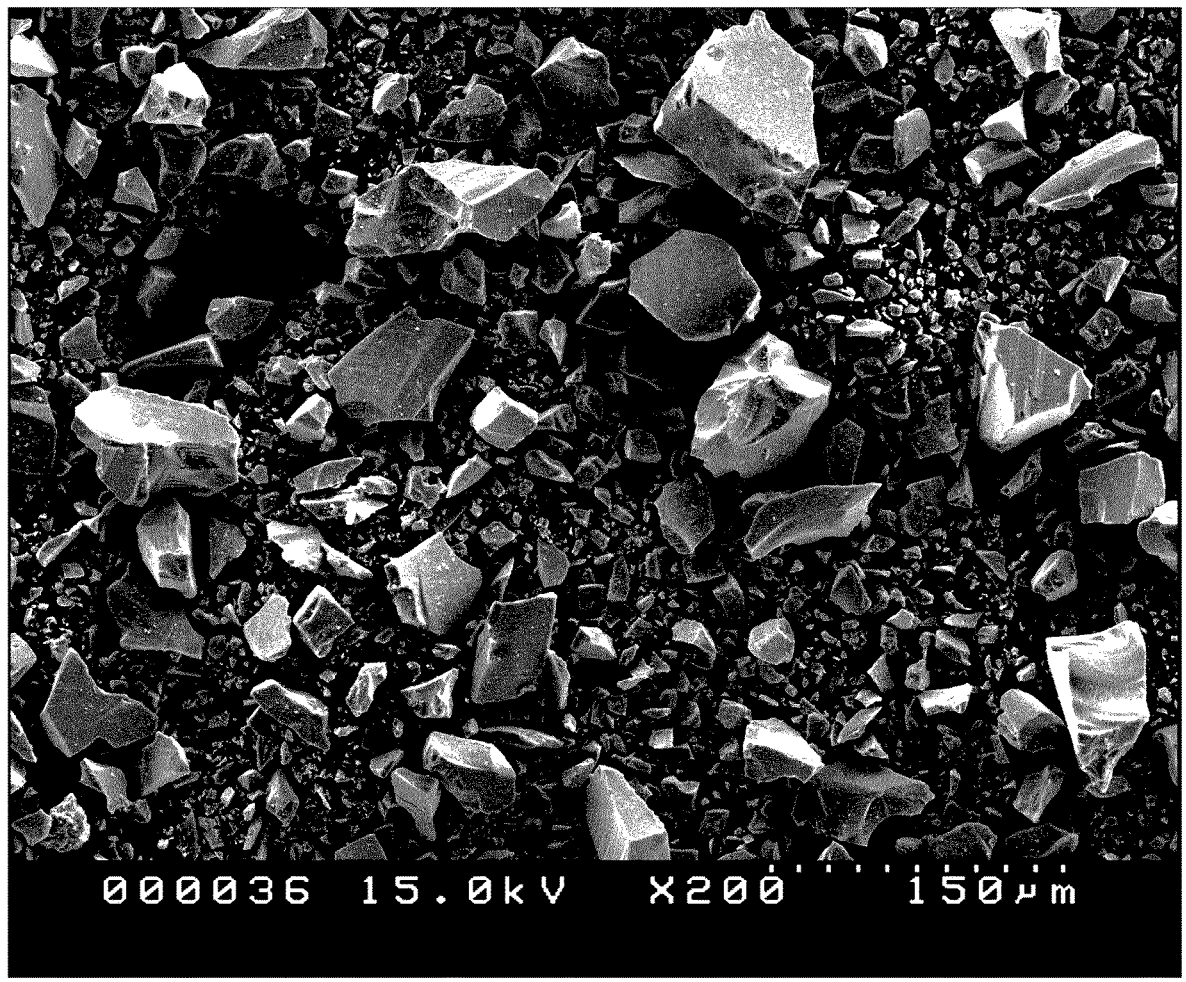
FIG. 1 is a micrometer-scale image of a forming material for three-dimensional (3D) printing according to an example of the present invention.

10: PARENT GLASS POWDER 20: SPHERICAL NANOPOWDER
110: SCALED LAYER 120: FIBROUS LAYER
130: POROUS LAYER 140: FILLER

MODES OF THE INVENTION

The forming material for three-dimensional (3D) printing, the forming method for 3D printing, and the formed object according to the examples of the present invention will be described in detail with reference to accompanying drawings. While the present invention can be modified in various ways and take on various alternative forms, specific embodiments thereof are shown in the drawings and are described in detail below as examples. There is no intent to limit the present invention to the particular forms disclosed. On the contrary, the present invention is to cover all modifications, equivalents, and alternatives falling within the spirit and scope of the present invention. In describing each of the drawings, like reference numerals are used to refer to like elements. In the accompanying drawings, the dimensions of the structures are either enlarged for the clarity of the present invention or reduced to promote the understanding of the schematic configuration of the structures.

In addition, terms such as "a/the first" and "a/the second" may be used to describe various elements of the present invention, but the elements should not be limited to the terms.

Such terms are used to merely distinguish one element from the other(s). For example, "the first element" may also be named "the second element," and similarly, "the second element" may also be named "the first element," without departing from the scope of the present invention. In the meantime, unless defined otherwise, all terms (including technical or scientific terms) used herein have the same meaning as commonly understood by one of ordinary skill in the art to which the present invention belongs. It will be understood that terms, such as those defined in commonly used dictionaries, should be interpreted as having a meaning that is consistent with their meaning in the context of the relevant art and should not be interpreted in an idealized or overly formal sense unless explicitly defined herein.

Figure 2:
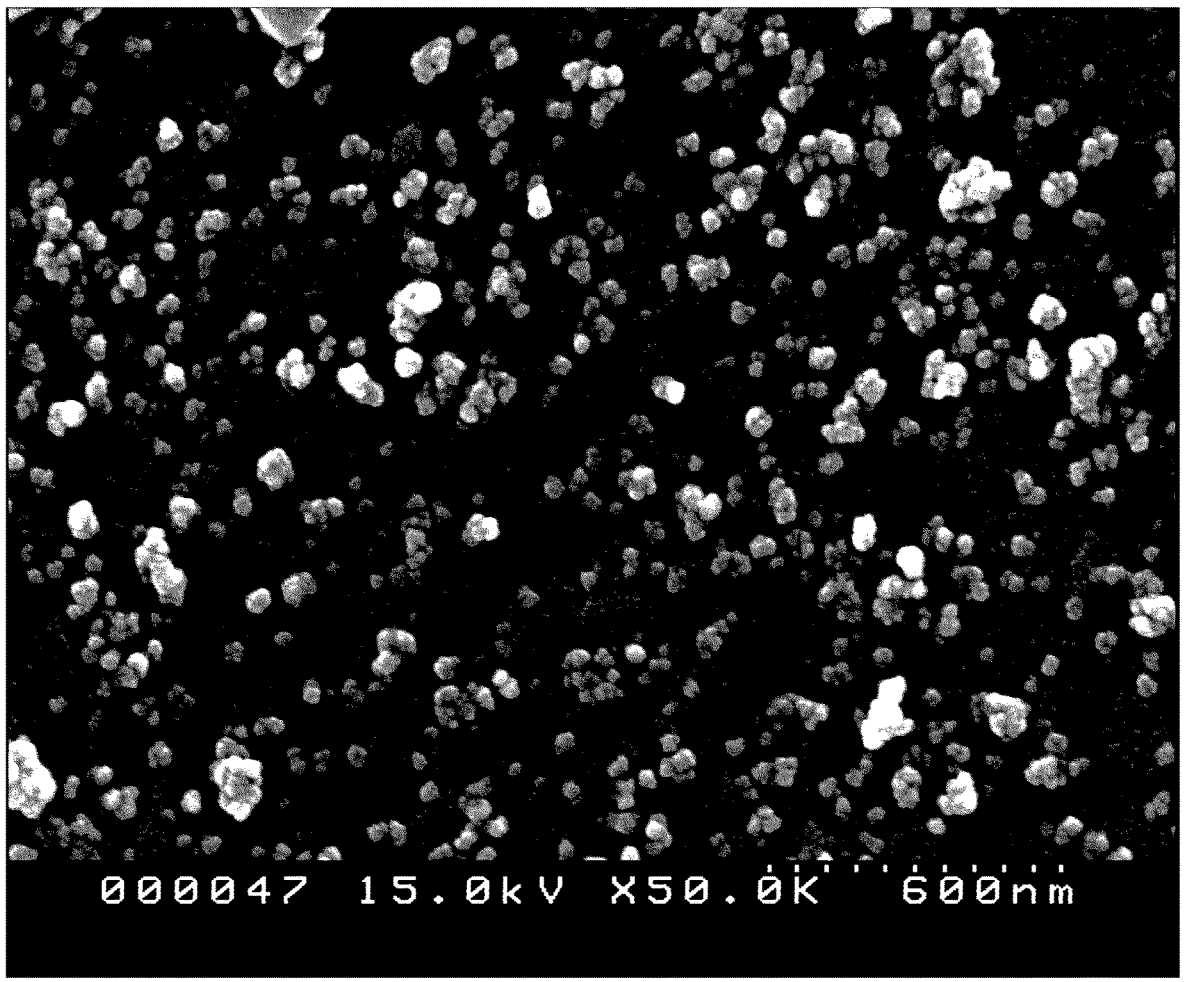
FIG. 2 is an image of a spherical nanopowder coated on a surface of a parent glass powder in a forming material for 3D printing according to an example of the present invention.

FIG. 1 is a micrometer-scale image of a forming material for 3D printing according to an example of the present invention. FIG. 2 is an image of a spherical nanopowder coated on a surface of a parent glass powder in a forming material for 3D printing according to an example of the present invention. FIGS. 3A to 3G are a series of reference drawings for describing step by step an influence of the spherical nanopowder on the parent glass powder in a forming material for 3D printing according to an example of the present invention.

As shown in FIGS. 1 and 2, the forming material for 3D printing according to an example of the present invention consists of a parent glass powder 10 in the form of an unmelted powder irregularly shaped by crushing amorphous glass and a spherical nanopowder 20 that has an average particle diameter equal to or less than $1/50^{th}$ of the average particle diameter of the parent glass powder 10 and is mixed in such a way that it can be disposed on a surface of the parent glass powder to enhance the flowability of the irregularly shaped parent glass powder 10 during the formation of an object by 3D printing. Referring to FIG. 1, it can be found that the particles of parent glass powder 10 mostly having an angular shape with irregularity are mixed throughout the material, and, in FIG. 2 that magnifies a part of FIG. 1, it can be found that the nano-sized particles of the spherical nanopowder 20 (in the image, a spherical glass powder is used as the spherical nanopowder 20) mixed together with the parent glass powder 10 are dispersed and coated on a surface of the parent glass powder 10.

*It is noteworthy that, in the case of such a forming material for 3D printing of an example of the present invention, a crushed glass powder mostly having an angular shape with irregularity is used as the parent material. As known, in the case of conventional forming materials for 3D printing, the focus has been mainly on the formability for the purpose of forming a particular article. In particular, when the use of a powder material was contemplated, since the flowability of a powder had been considered as an important variable affecting the formability, the use of an angular shaped powder, such as a crushed glass powder, which was thought to inhibit the flowability, was considered reckless. However, the forming material for 3D printing according to an example of the present invention is a novel forming material for 3D printing consisting of a mixture of an irregularly shaped parent glass powder 10 and a spherical nanopowder 20, and the use thereof was suggested by boldly casting away the aforementioned common prejudice by discovering the fact that, even when a glass powder mostly having an irregularly angular shape is used as the parent material, if only a surface of the glass powder contains a finer, nano-sized spherical nanopowder 20 dispersed and coated thereon, sufficient flowability for 3D printing can be ensured. Needless to say, this fact is supported by various conditions and specific configurations, which will be focused and described in more detail hereinafter.

The parent glass powder 10 is the parent material of the formed article prepared by 3D printing and, as stated above, is formed as an unmelted powder irregularly shaped by crushing amorphous glass. Here, the material for the parent glass powder 10 may be any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component.

In addition, it is preferable that the parent glass powder 10 is prepared to have an average particle diameter in a range of 1 to 200 μm. Problems associated with this include the fact that the flowability of the powder particles is reduced as the relative particle size gets smaller, even though a smaller particle diameter of the parent glass powder 10 is more advantageous for the formation of a precise and nondefective article. Therefore, it is preferable to prepare a parent glass powder 10 having an average particle diameter in a range of 1 to 200 μm. In this case, the size of the spherical nanopowder 20 mixed with the parent glass powder 10 to be dispersed and coated on a surface of the same may be selected with some flexibility as long as it is appropriate for the size of the parent glass powder 10. With the nanopowder having a size of 100 nm or less, the flowability required for forming a structure can be attained, and one with a smaller size can also be selected. Here, in order to prepare the parent glass powder 10, the glass material is melted, the melt is prepared into thin cullets for the ease of crushing by being poured on a ribbon roller, and the cullets are crushed step by step, not in a single step. That is, the cullets are crushed for the first time through ball milling to form coarse particles, which are crushed for the second time through jet milling (jet milling is preferable but ball milling is also possible) capable of crushing into particles with smaller diameters to form fine particles. As described, through the method of preparing cullets based on amorphous glass and crushing the cullets step by step in two steps, a parent glass powder 10 having a more uniform particle diameter can be prepared.

For reference, instead of going through the aforementioned crushing process for the preparation of the parent glass powder 10, purchasing spherical, nano-sized glass particles in the first place is also worth considering. However, with such a method being used, it is practically impossible to prepare a large amount of a micrometer-scale parent glass powder 10 because of a low yield, which is characteristic to a process that obtains a spherical powder by sublimating the raw material at a high temperature and then cooling the same instantaneously. In the meantime, when the parent glass powder 10 is nano-sized, the cohesion of the particles is strong, and thus, the flowability required for forming a structure becomes impossible to attain.

The spherical nanopowder 20 functions to improve the flowability, which may be the biggest concern of using the irregularly shaped parent glass powder 10. For this purpose, as described above, the spherical nanopowder 20 has an average particle diameter equal to or less than $\frac{1}{50}^{th}$ of the average particle diameter of the parent glass powder 10 and is mixed in such a way that it is disposed on a surface of the parent glass powder 10. The magnified image provided in FIG. 2 shows that the spherical nanopowder 20 is coated, in a dispersed state, on a surface of the parent glass powder 10. In order to be coated on a surface of the parent glass powder 10 in a uniformly dispersed state, it is sufficient if the spherical nanopowder 20 is mixed in a mixing ratio in a range of 0.01 vol. % to 1 vol. % of the total powder mixture and has an average particle diameter of 100 nm or less, which is relatively very small compared to the parent glass powder 10.

Figure 3A:
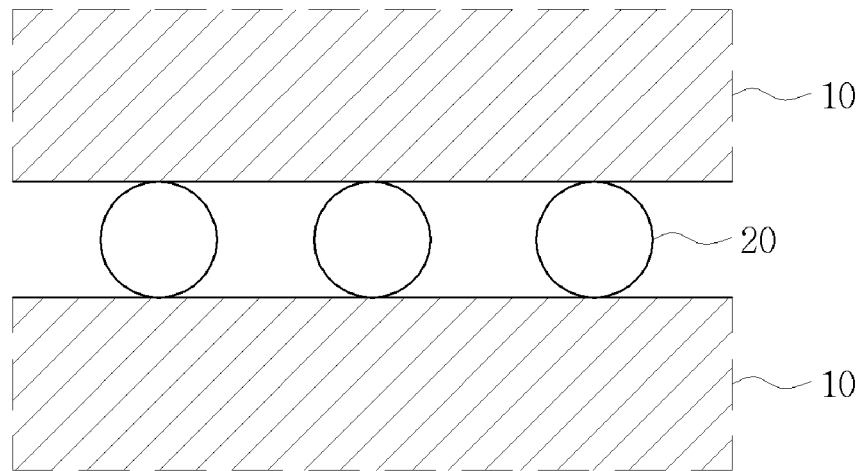
FIGS. 3A to 3G are a series of reference drawings for describing step by step an influence of the spherical nanopowder on the parent glass powder in a forming material for 3D printing according to an example of the present invention.
Figure 3B:
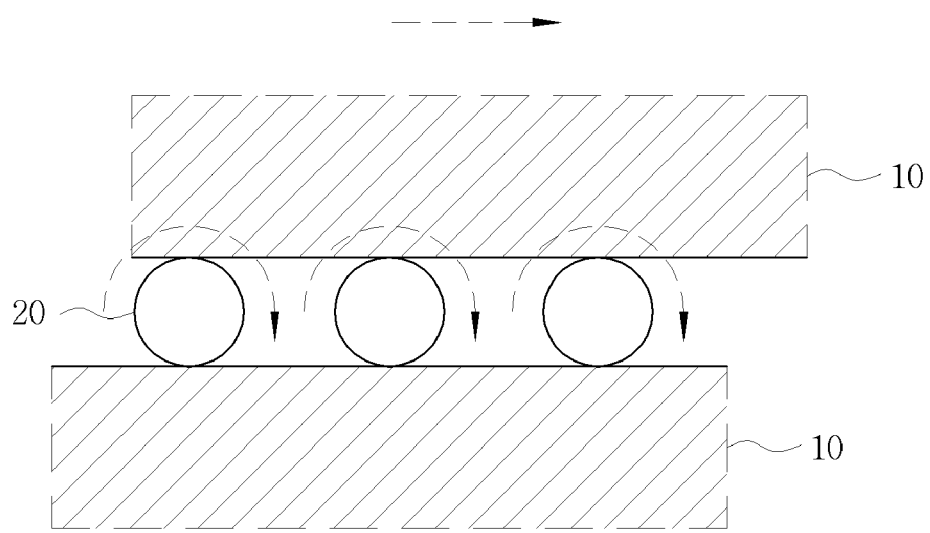
Figure 3C:
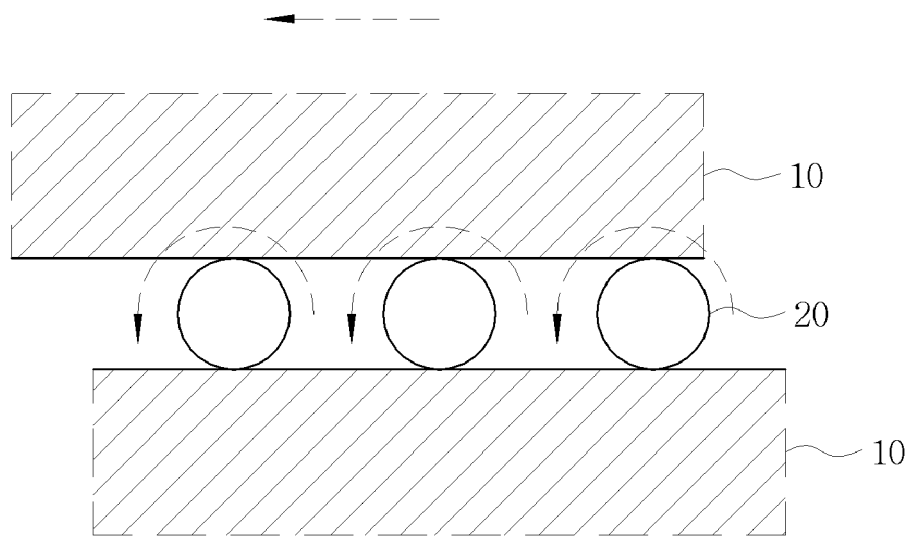

When the spherical nanopowder 20 is coated on a surface of the parent glass powder 10 in a dispersed state as described, the spherical nanopowder 20 improves the flowability by preventing direct contact among the particles of the parent glass powder 10 and making room for the mobility of the particles by spacing the particles apart as illustrated in FIG. 3A, while functioning as a bearing among the particles as illustrated in FIGS. 3B and 3C when there is a force that is about to displace the particles of the parent glass powder 10.

The material for the spherical nanopowder 20 may be multicomponent oxide glass that belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component. According to the above description, the material for the spherical nanopowder 20 may possibly be the same as the material consisting the parent glass powder 10, in which case, there are advantages of not having a risk of the parent glass powder 10 being contaminated and not causing closed pores, which is a problem for assuring transmittance, during the sintering process. In addition, when a spherical nanopowder 20 having a glass transition temperature lower than the glass transition temperature of the parent glass powder 10 is selected, the spherical nanopowder 20 not only improves the flowability of the irregularly shaped parent glass powder 10 but also functions as a sintering promoter. In other words, as illustrated in FIGS. 3D to 3G, since the spherical nanopowder 20 having a smaller particle diameter is sintered preferentially, the sintering begins at the surface of the parent glass powder 10 where the parent glass powder is in contact with the spherical nanopowder 20. Therefore, the sintering of the parent glass powder 10 occurs at an earlier stage, and thus, the time required for the entire sintering process can be reduced. In order to promote sintering as thus, it is preferable that a spherical nanopowder 20 having an average particle diameter of 10 nm or less is selected.

In the meantime, the spherical nanopowder 20 may be prepared based on a single oxide that has an average particle diameter of 100 nm or less and is based on any one of $SiO_2$, $Y_2O_3$, $Al_2O_3$, $TiO_2$, ZrO, NiO, CoO, $CeO_2$, MgO, CaO, $WO_3$, CuO, and $Fe_2O_3$. When the spherical nanopowder 20 is based on any of such materials, it enhances the flowability of the parent glass powder 10 by default and, during the sintering process, enhances the forming strength while not reacting with the parent glass powder 10.

In addition, it is possible to select a combination of multicomponent oxide glass and a single oxide as the material for the spherical nanopowder 20, wherein the multicomponent oxide glass belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component, and the single oxide is any one of $SiO_2$, $Y_2O_3$, $Al_2O_3$, $TiO_2$, ZrO, NiO, CoO, $CeO_2$, MgO, CaO, $WO_3$, CuO, and $Fe_2O_3$. When such a combined spherical nanopowder 20 is mixed with the parent glass powder 10, the flowability of the parent glass powder 10 can be improved and, upon sintering, the forming strength can be improved and sintering can be promoted. Since both types of materials function to promote sintering and enhance the forming strength while playing a major role of improving the flowability of the parent glass powder 10, the contents thereof may be adjusted by determining which among sintering promotion and forming strength enhancement should be seen as more important and then increasing the content of one material over the other accordingly.

Hereinafter, summary of the materials for the spherical nanopowder 20 classified according to the aforementioned functions will be provided.

<Function: Flow Ability Enhancement>

Multicomponent oxide glass that belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component Spherical particles, 100 nm or less <Function: Flowability Enhancement+Sintering Promotion>

Multicomponent oxide glass that belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component Spherical particles, 10 nm or less, configured to have a glass transition temperature lower than the glass transition temperature of the parent glass powder 10 by default <Function: Flowability Enhancement+Forming Strength Enhancement>

A single oxide such as $SiO_2$, $Y_2O_3$, $Al_2O_3$, $TiO_2$, ZrO, NiO, CoO, $CeO_2$, MgO, CaO, $WO_3$, CuO, or $Fe_2O_3$ Spherical particles, 100 nm or less <Function: Flowability Enhancement+Sintering Promotion+Forming Strength Enhancement>

Multicomponent oxide glass that belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component+a single oxide such as $SiO_2$, $Y_2O_3$, $Al_2O_3$, $TiO_2$, ZrO, NiO, CoO, $CeO_2$, MgO, CaO, $WO_3$, CuO, or $Fe_2O_3$ In the case of multicomponent oxide glass, it is configured to have spherical particles sized 10 nm or less and a glass transition temperature lower than the glass transition temperature of the parent glass powder 10. In the case of a single oxide, it has spherical particles sized 100 nm or less.

Subsequently, a forming method by 3D printing according to an example of the present invention based on the aforementioned forming material for 3D printing will be described.

Figure 4:
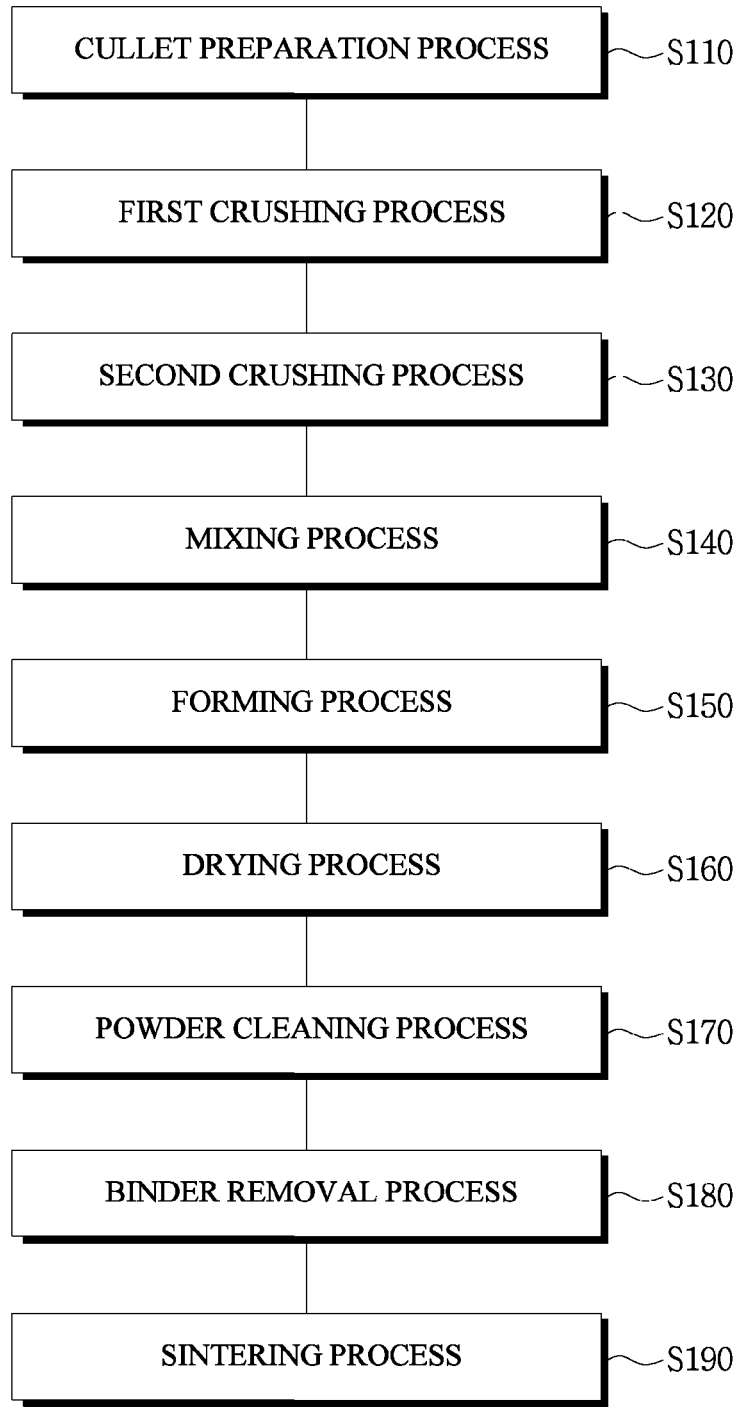
FIG. 4 is a flowchart for describing a forming method by 3D printing according to an example of the present invention.

FIG. 4 is a flowchart for describing a forming method by 3D printing according to an example of the present invention.

As illustrated, the forming method by 3D printing according to an example of the present invention consists of a cullet preparation process S110, a first crushing process S120, a second crushing process S130, a mixing process S140, a forming process S150, a drying process S160, a powder cleaning process S170, a binder removal process S180, and a sintering process S190.

Looking at those processes in detail, a forming material for 3D printing having a unique shape is prepared through the cullet preparation process, the first crushing process, the second crushing process, and the mixing process, and then the forming material is used for preparing a desired article through the forming process, the drying process, the powder cleaning process, the binder removal process, and the sintering process. Hereinafter, the forming method by 3D printing according to an example of the present invention will be described in more detail by focusing on each of the above processes.

First, the cullet preparation process prepares thin cullets by mixing accurately weighed glass material powders according to a mixing composition, melting the mixture, and pouring the melt on a ribbon roller. Here, the glass material is based on any one of $SiO_2$, $Bi_2O_3$, $P_2O_5$, $V_2O_5$, PbO, and $TeO_2$ as the main ingredient and is used to prepare glass cullets that belong to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component.

Subsequently, the first crushing process is carried out. During the first crushing process, the cullets prepared during the previous process are crushed to prepare coarse particles (an RC powder). For this purpose, a ball miller is used. The minimum size of the glass powder particles obtained through this process is suitably about 15 μm. In order to obtain fine particles having a smaller size, a longer ball milling process time is needed, but longer processing leads to severe contamination (ZrO and $Al_2O_3$ balls are used, and such balls either collide with one another or collide with an inner wall of the container, generating contaminants). Therefore, a jet milling process should be used to prepare a glass powder having a smaller particle size. For reference, when severely contaminated, the light transmittance of the glass powder is poor after sintering.

Next, the second crushing process is carried out. During the second crushing process, the coarse particles are crushed for the second time by jet milling (or ball milling) to form fine glass particles. The jet milling process is a process that induces the continuous crushing of particles by generating a jet current to induce collisions among the coarse particles obtained through the previous process, and, during this process, the coarse particle having a size of 15 μm are crushed minutely into fine particles having a minimum size of 2 to 3 μm. With this, the parent glass powder 10 in the form of an irregularly shaped, unmelted powder can be obtained.

Subsequently, the mixing process is carried out. During the mixing process, the parent glass powder 10 and the spherical nanopowder 20 are mixed together. For this purpose, the spherical nanopowder 20 is added, in a ratio of 0.01 vol. % to 1 vol. %, to the parent glass powder 10, and then the two are dry mixed for about 4 hours using a tubular mixer. When the flowability enhancement is mainly contemplated, the spherical nanopowder 20 used for this process is one with spherical particles having a size of 100 nm or less, is based on multicomponent oxide glass that belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component, and is either purchased or produced for use.

In the meantime, when both flowability enhancement for the parent glass powder 10 and sintering promotion are contemplated, spherical particles with a size of 10 nm or less that are based on multicomponent oxide glass that belongs to any one of a glass composition system having $SiO_2$ as the main component, a glass composition system having $Bi_2O_3$ as the main component, a glass composition system having $P_2O_5$ as the main component, a glass composition system having $V_2O_5$ as the main component, a glass composition system having PbO as the main component, and a glass composition system having $TeO_2$ as the main component are either purchased or produced for use, and, in the case of such a spherical nanopowder 20, it is important that the glass transition temperature of the spherical nanopowder is lower than the glass transition temperature of the parent glass powder 10.

In addition, when both the flowability enhancement for the parent glass powder 10 and forming strength enhancement are contemplated, spherical particles with a size of 100 nm or less that are based on a single oxide of any one of $SiO_2$, $Y_2O_3$, $Al_2O_3$, $TiO_2$, ZrO, NiO, CoO, $CeO_2$, MgO, CaO, $WO_3$, CuO, and $Fe_2O_3$ are either purchased or produced for use, and, in the case of such a spherical nanopowder 20, it is important that the spherical nanopowder does not react with the parent glass during sintering.

When all of the flowability enhancement for the parent glass powder 10, sintering promotion, and forming strength enhancement are desired, the above two types of spherical nanopowder 20 materials may be mixed in a suitable ratio for use. For this purpose, dry mixing in a device such as a tubular mixer may be performed. Such a dry mixing process is accompanied by a high impingement force and a shear stress between the spherical nanopowder 20 and the parent glass powder 10, and, due to a large amount of heat and static electricity generated instantaneously at the interface, the spherical nanopowder 20 is coated on the parent glass powder 10 in a dispersed state.

When such a mixing process is complete, a forming material for 3D printing is obtained, and, as shown in FIG. 2, such a forming material contains the parent glass powder 10 and the spherical nanopowder 20 coated on a surface of the parent glass powder in a dispersed state.

Next, the forming process is carried out. During the forming process, a 3D formed object is prepared through 3D printing using the forming material prepared by mixing the parent glass powder 10 and the spherical nanopowder 20 during the previous processes. For this purpose, a plurality of single layers are accumulated by repeatedly forming a single layer using the forming material, and a liquid binder is applied every time a single layer is formed such that the fixation of the single layer being formed on top is induced. Also, the laminated object formed by accumulating single layers is pressed with a roller repeatedly at a fixed time interval. Such a forming method is not limited to a certain method and may be performed in variously modified ways.

Here, what should be brought into our attention is that, during the forming process, the spherical nanopowder 20 improves the flowability by preventing direct contact among the particles of the parent glass powder 10 and making room for the mobility of the particles by spacing the particles apart as illustrated in FIG. 3A, while functioning as a bearing among the particles as illustrated in FIGS. 3B and 3C when there is a force that is about to displace the particles of the parent glass powder 10. This facilitates formation by 3D printing even when an irregularly shaped parent glass powder 10 consisting mainly of rough, angular particles is used as a main ingredient for the forming material.

Next, the drying process is carried out. By drying the formed object prepared through the forming process, the drying process ensures that the formed object is not easily destroyed during a subsequent process.

Next, the powder cleaning process is carried out. During the powder cleaning process, powder particles accumulated on the formed object are removed. Such a powder cleaning process may be performed repeatedly before and after the drying process.

Next, the binder removal process is carried out. During the binder removal process, the binder used for the forming process is removed by heat treatment. For this purpose, heat is applied to remove the binder, and the temperature at which the binder is removed is lower than the glass transition temperature of the parent glass powder 10. When such a binder removal process is complete, all preparations for sintering are practically done.

Figure 3D:
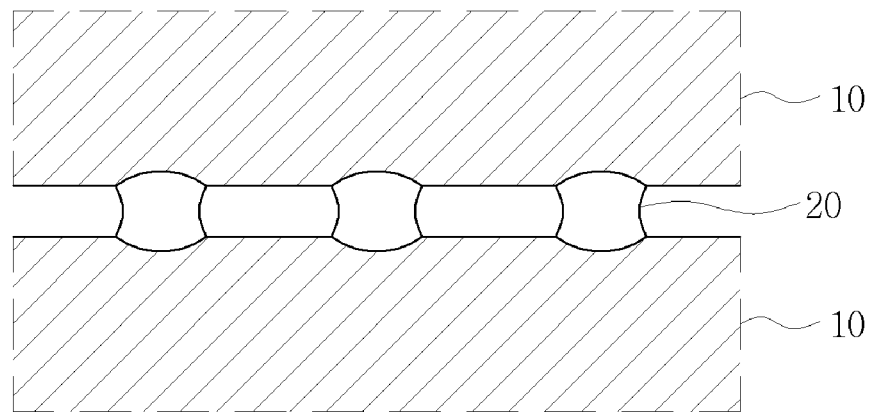
Figure 3E:
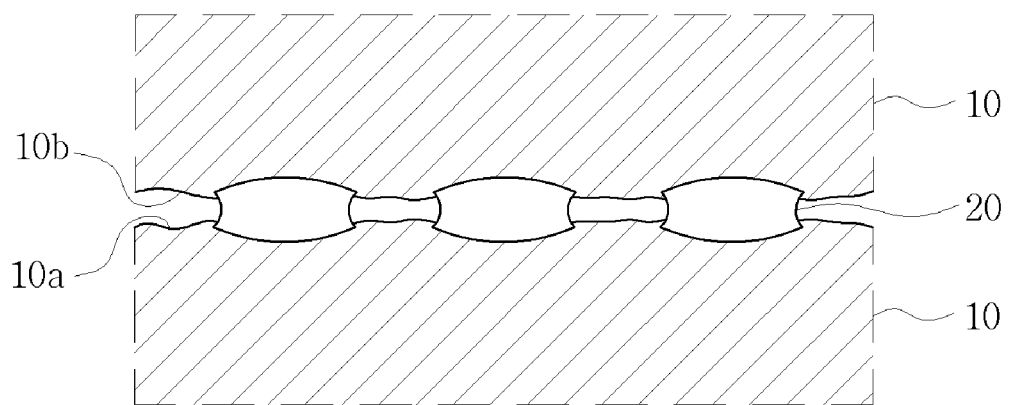
Figure 3F:
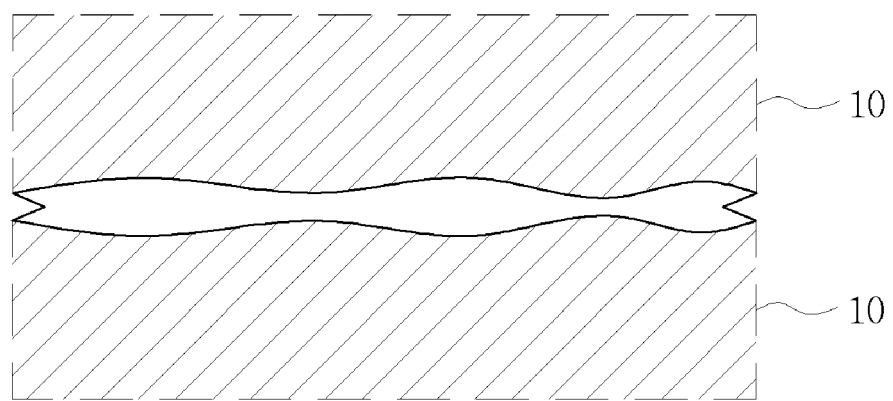
Figure 3G:
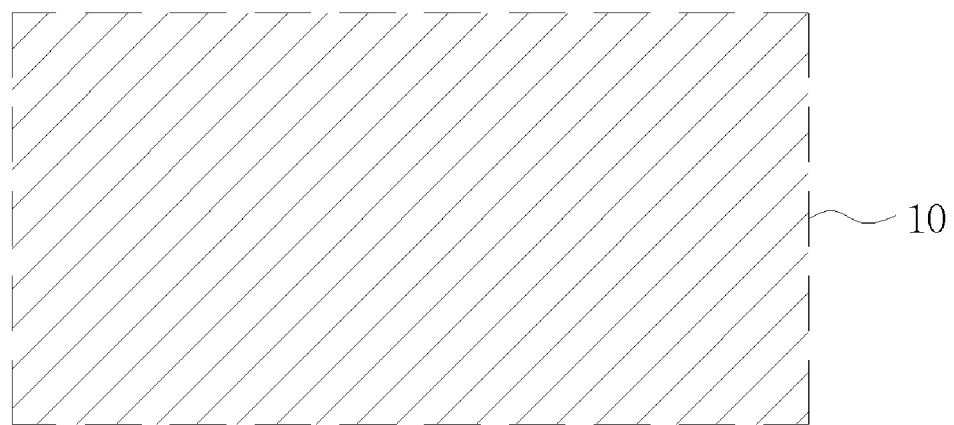

Next, the sintering process is carried out. During the sintering process, the object formed during the forming process is sintered. During this process, as illustrated in FIG. 3D, the spherical nanopowder 20 having a smaller particle diameter melts first before the maximum-shrinkage temperature of the parent glass powder 10 is reached, and, as illustrated in FIGS. 3E and 3F, the sintering begins at the surface of the parent glass powder 10 where the parent glass powder is in contact with the spherical nanopowder 20, and thus, the sintering of the parent glass powder 10 occurs at an earlier stage. Accordingly, as illustrated in FIG. 3G, the time required for the entire sintering process can be significantly reduced, and the sintered form of an article of interest can be obtained. In order to promote sintering, it is preferable that the spherical nanopowder 20 has an average particle diameter of 10 nm or less.

Hereinafter, the 3D formed object that mimics the integumentary system of a living body and is formed based on the aforementioned forming material for 3D printing and forming method for 3D printing method will be described.

Figure 5:
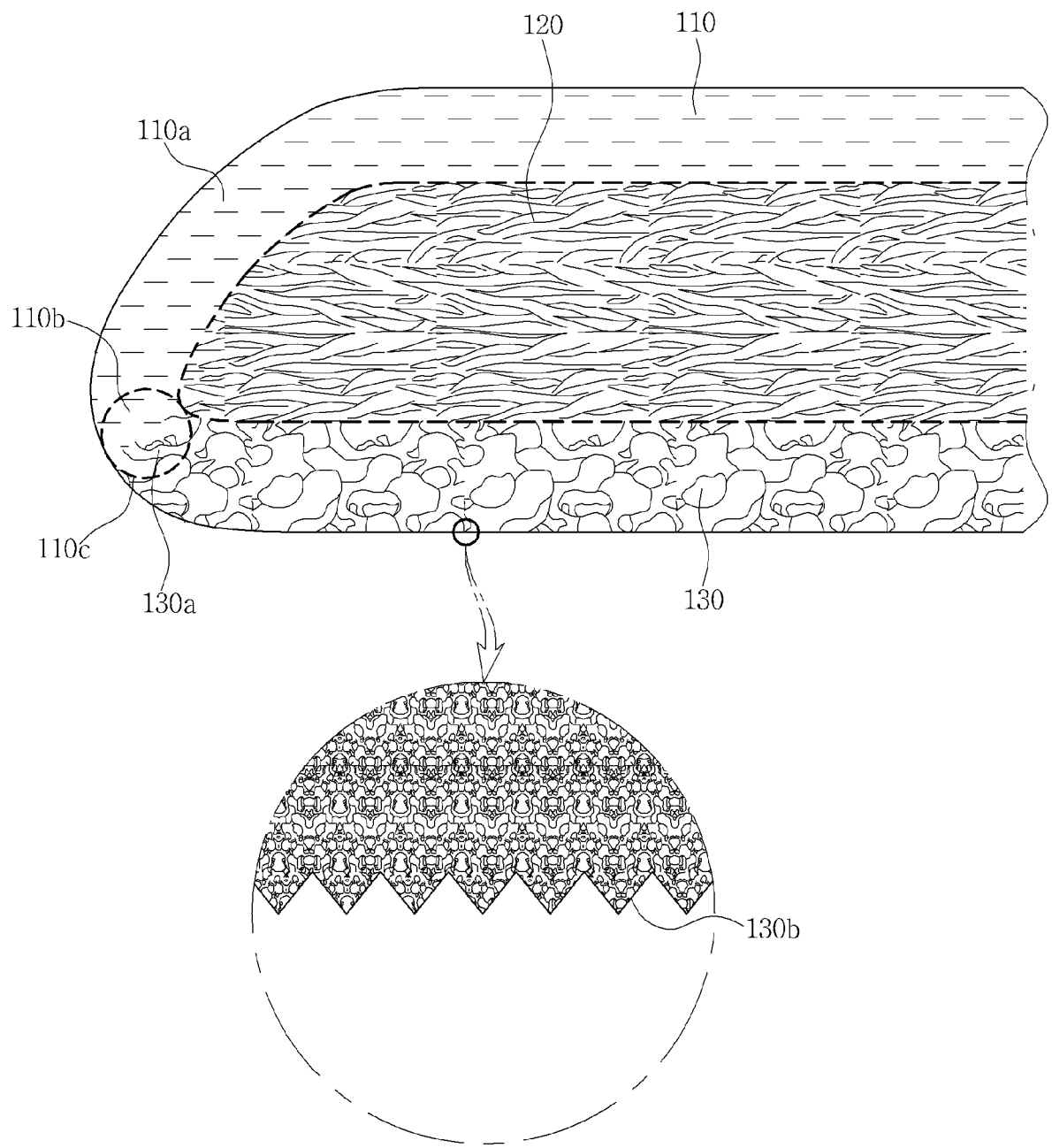
FIG. 5 is a longitudinal sectional view for describing a 3D formed object according to an example of the present invention, which mimics the integumentary system of a living body.
Figure 6:
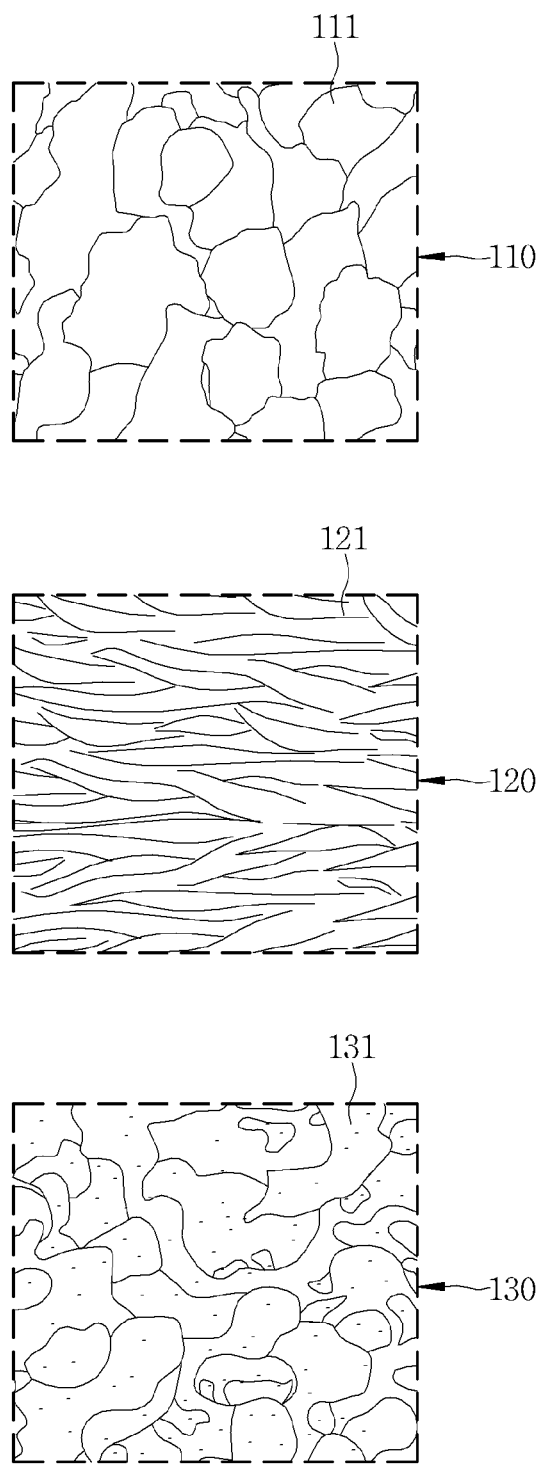
FIG. 6 is a cross-sectional enlarged view for describing the structure of a 3D formed object according to an example of the present invention, which mimics the integumentary system of a living body.
Figure 7:
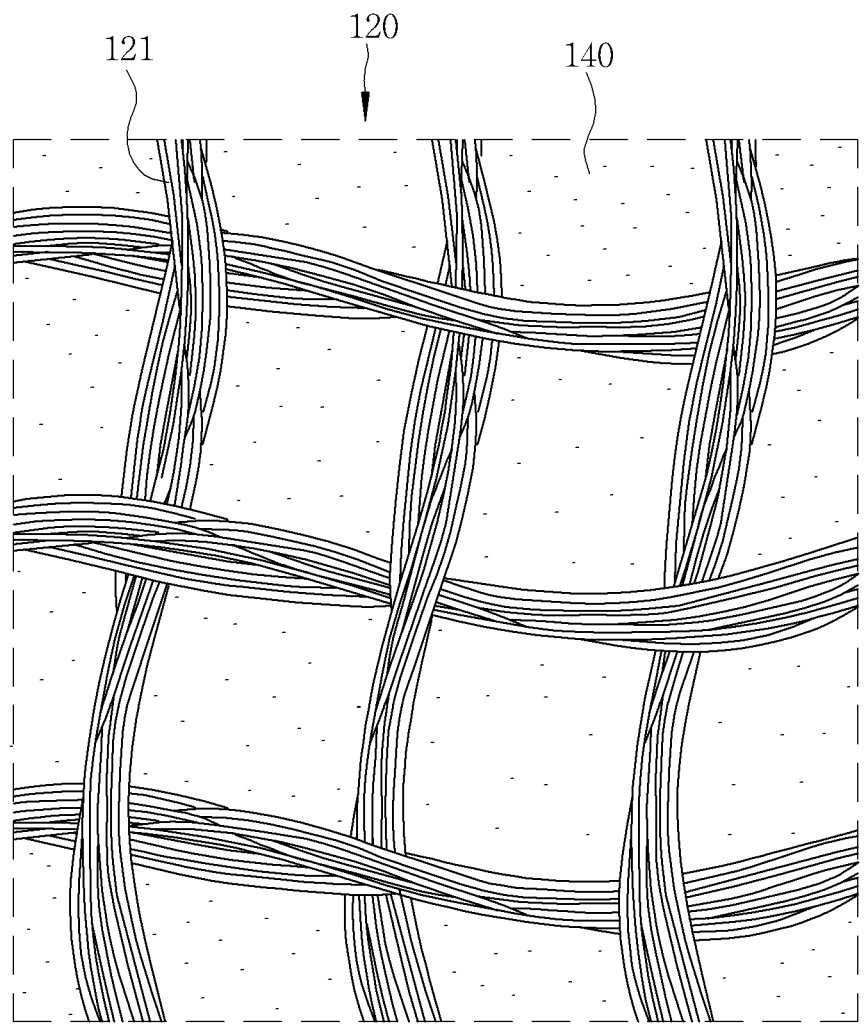
FIGS. 7 and 8 are enlarged configurational diagrams for describing the detailed configuration of a 3D formed object according to an example of the present invention, which mimics the integumentary system of a living body.
Figures 8, 9:
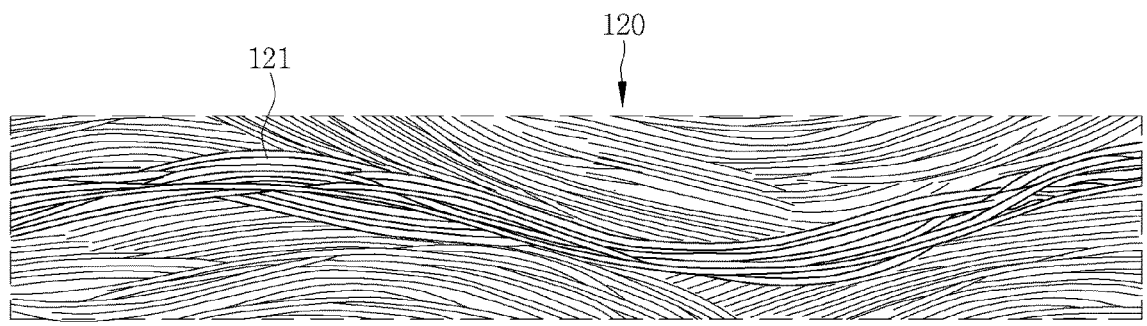
FIG. 9 is a set of comparative images of formed objects for showing the surface properties of the formed objects with and without the mixing of a spherical nanopowder into the forming material.

FIG. 5 is a longitudinal sectional view for describing a 3D formed object according to an example of the present invention, which mimics the integumentary system of a living body, and FIG. 6 is a cross-sectional enlarged view for describing the structure of a 3D formed object according to an example of the present invention, which mimics the integumentary system of a living body. In addition, FIGS. 7 and 8 are enlarged configurational diagrams for describing the detailed configuration of a 3D formed object according to an example of the present invention, which mimics the integumentary system of a living body.

The 3D formed object mimicking the integumentary system of a living body according to an example of the present invention mimics, by analyzing and interpreting, the structure of the integumentary system such as a nail having complex properties such as light transmittance, a shielding function, and high toughness.

As illustrated, such a formed object consists of a central fibrous layer 120 responsible for mechanical strength, including high toughness, that can deal with the impacts and pressure applied by an external source, a scaled layer 110 that has a shielding function of blocking the dust, moisture, noise, and unnecessary light coming from an external source, and a porous layer 130 that functions to control the transmittance of the light coming from an external source and either passing through the scaled layer 110 and fibrous layer 120 or transmitted in the opposite direction and to absorb noise and plays a pivotal role in weight reduction. In addition, in the scaled layer 110, fibrous layer 120, and porous layer 130, a filler 140 having a necessary function may be used to fill the pores and gaps among structural units 121.

The fibrous layer 120 is responsible for mechanical strength, including high toughness, against impacts and pressure while ensuring light transmittance. For this purpose, the fibrous layer 120 is formed in such a way that linear structural units 121 having a diameter of 10 μm or less are overlapped partly, forming minute gaps there among such that light transmission is possible. When consisting of the linear structural units 121 as described, the fibrous layer 120 attains high strength and elastic modulus, and, when based on amorphous parent glass powder 10, crystallization does not occur in a heated environment, and thus, the strength can be maintained even with a temperature change due to an external source.

Looking into the way in which the structural units 121 of the fibrous layer 120 are overlapped, first, as shown in FIG. 7, the layer may be formed in such a way that two or more groups, each of which consists of the structural units 121 of the fibrous layer 120 gathered into a bundle, are laid along different directions from one another, crossing one another. As shown in FIG. 8, the fibrous layer 120 may also be formed in such a way that the structural units 121 of the layer are laid along the same direction and are gathered together. Although both structures can exhibit the elastic modulus and high strength required for high toughness, particularly the former structure, in which the structural units 121 of the fibrous layer 120 are laid along two or more directions and cross one another, offers a benefit of relatively insignificant directionality of the mechanical strength and superior impact absorption over the latter structure. Also, the former structure exhibits a higher flexural strength compared to the latter structure in which the structural units 121 are laid along a single direction. However, the latter structure is relatively more advantageous than the former one in terms of the ease of preparation. Such a fibrous layer 120 may be configured to occupy ½ or more of the total thickness of the formed object 100 to ensure sufficient mechanical strength including high toughness.

The scaled layer 110 is responsible for a shielding function such that the foreign substances, such as dust particles involved in high-speed collisions from the outside, air, moisture, noise, and unnecessary light can be blocked. For this purpose, the scaled layer 110 consists of plate-like structural units 111 which are partly overlapped 110c in the form of scales 110b, forming minute gaps 110a among one another such that light can be transmitted. FIG. 6 effectively shows the structural units 111 of the scaled layer 110 partly overlapped in the form of scales, and, with such a structure in which the plate-like structural units 111 of the scaled layer 110 are partly overlapped in the form of scales, the dust particles involved in collisions from the outside, air, moisture, and even unnecessary light can be effectively blocked and prevented from entering, and the blocking of noise through reflection can also be expected. In this case, it is possible to control the rate of light transmission from an external source by adjusting the gaps among the structural units 111 of the scaled layer 110. For example, the rate of light transmission decreases with thicker structural units 111 of the scaled layer 110 or smaller gaps among the structural units 111, and the rate of light transmission increases with thinner structural units 111 of the scaled layer 110 or larger gaps among the structural units 111. Compared to other layers, the scaled layer 110 may be relatively difficult to form by 3D printing using a forming material. Therefore, unlike other layers, it may be worth considering forming the layer by a method other than 3D printing and then assembling the same with other layers.

The porous layer 130 is configured to have a higher porosity compared to the scaled layer 110 or the fibrous layer 120 such that it plays a role of controlling the overall transmission of the light either coming from the outside and passing through the scaled layer 110 and fibrous layer 120 or transmitted outward from the inside. For this purpose, the porous layer 130 is formed into a sponge-like structure 131 having a plurality of pores. Having such a structure, the porous layer 130 has a relatively high rate of light transmission and a low light blocking rate compared to the scaled layer 110 and the fibrous layer 120. Therefore, differential light transmittance that depends on the direction, i.e., the outside is clearly visible from the inside where the porous layer 130 is positioned, but the inside is not easily visible from the outside where the scaled layer 110 is located, can be realized. In this case, since the porous layer 130 does not play a relatively essential role compared to the scaled layer 110 having a shielding function or the fibrous layer 120 responsible for mechanical properties, the structure of the porous layer can be easily altered and the overall light transmittance can be controlled by adjusting porosity.

In addition, the porous layer 130 may be configured to have a fine concavo-convex pattern 130b consisting of a lower portion and a higher portion alternately repeated in the form of a wave 130a on a bottom surface (see the magnified portion of FIG. 5). When the porous layer 130 contains the fine concavo-convex pattern 130b on a surface thereof, the problem of a reduced stiffness caused by the porosity of the porous layer being higher than that of the scaled layer 110 or the fibrous layer 120 can be remedied. Also, a larger adhesive area can be ensured due to an increased surface area, which is useful when the formed object 100 of an example of the present invention is to be attached to another structure. In addition, the porous layer 130 also absorbs noise, in which case, the fine concavo-convex pattern 130b leads to a larger surface area in contact with the noise, thus enabling the absorption of more noise.

<Test Example>

During the present experiment, a simple rectangular parallelepiped having an internal channel was formed by 3D printing and using, as the forming material, a crushed parent glass powder having an average particle diameter of 22 μm and based on a glass composition system that has $SiO_2$ as the main component ($SiO_2$—$ZnO$—$B_2O_3$—$Al_2O_3$—$BaO$), and the results obtained with and without the addition at 0.5 vol. % of a spherical nanopowder having an average particle diameter of 12 nm and based on the same glass composition system that has $SiO_2$ as the main component were mutually compared. During the forming process, the layer thickness was 180 μm, the binder saturation was at 300%, and the dimensions of the formed object were 10 mm×10 mm×5 mm, and a sintering process was subsequently performed. In this case, to prepare a 3D formed object with a powder mixture of the parent glass powder and the spherical $SiO_2$ nanopowder, a maltodextrin aqueous solution was used as a binder solution. For the present experiment, a 10% maltodextrin aqueous solution was used, and the viscosity thereof at room temperature (21° C.) is 4.5 cP. For reference, binder solutions that can be used with a 3D printing technique include 10%-20% maltodextrin, polyvinyl alcohol, polyvinyl butyral, and the like.

As shown on the left (SZB glass) of FIG. 9, when only the parent glass powder is used without being mixed with a spherical nanopowder, the powder had a high tendency to cohere, resulting in an object formed with a highly heterogeneous surface. In contrast, as shown on the right (SZB glass with nano-silica) of FIG. 9, when a powder mixture containing an added spherical nanopowder is used as the forming material, the flowability significantly improved during the forming process, thus resulting in an object formed with a homogeneous surface.

When the properties of the formed object subsequently sintered were examined, it could be found that the formed object shrank much less and had a higher tendency to maintain the original shape without being destroyed when the powder mixture containing an added spherical nanopowder (FIG. 11), rather than only the parent glass powder not being mixed with a spherical nanopowder (FIG. 10), was used as the forming material and sintering is subsequently performed.

Figure 10:
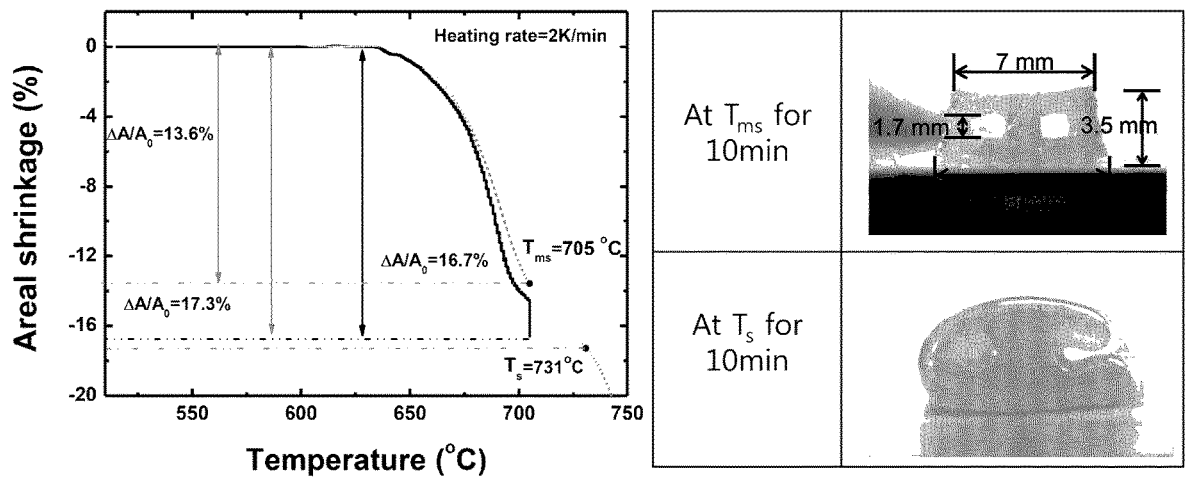
FIG. 10 provides images of sintered objects obtained by sintering, respectively at the maximum-shrinkage temperature and the Littleton softening temperature, a formed object prepared using only the parent glass powder without adding a spherical nanopowder thereto and a graph showing the rate of shrinkage of the sintered objects at each temperature.
Figure 11:
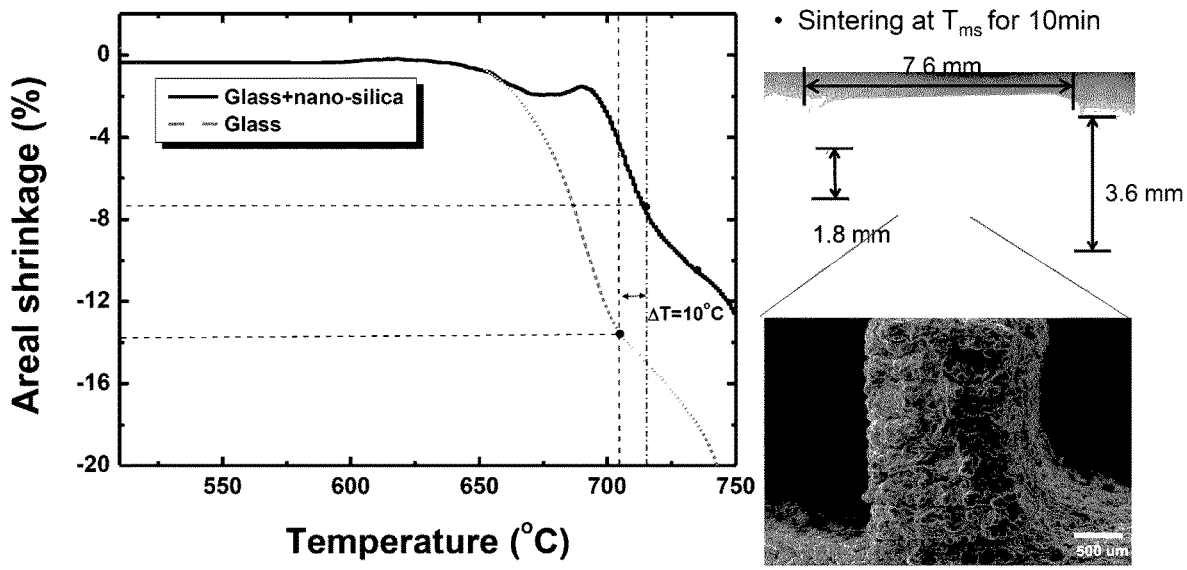
FIG. 11 provides an image of a sintered object obtained by sintering, at the maximum-shrinkage temperature, a formed object prepared by adding a spherical nanopowder to the parent glass powder and a graph showing the rate of shrinkage of the sintered object.

The suitable temperature for the sintering of the formed object should be in a range between the maximum-shrinkage temperature and the Littleton softening temperature of the parent glass powder. As shown in FIG. 10, when the sintering is performed at the maximum-shrinkage temperature of the parent glass powder, the formed object is not thoroughly sintered and a high sintering density is difficult to attain, whereas, when the sintering is performed at the Littleton softening temperature, a high sintering density can be attained but the structure is difficult to maintain.

Figure 12:
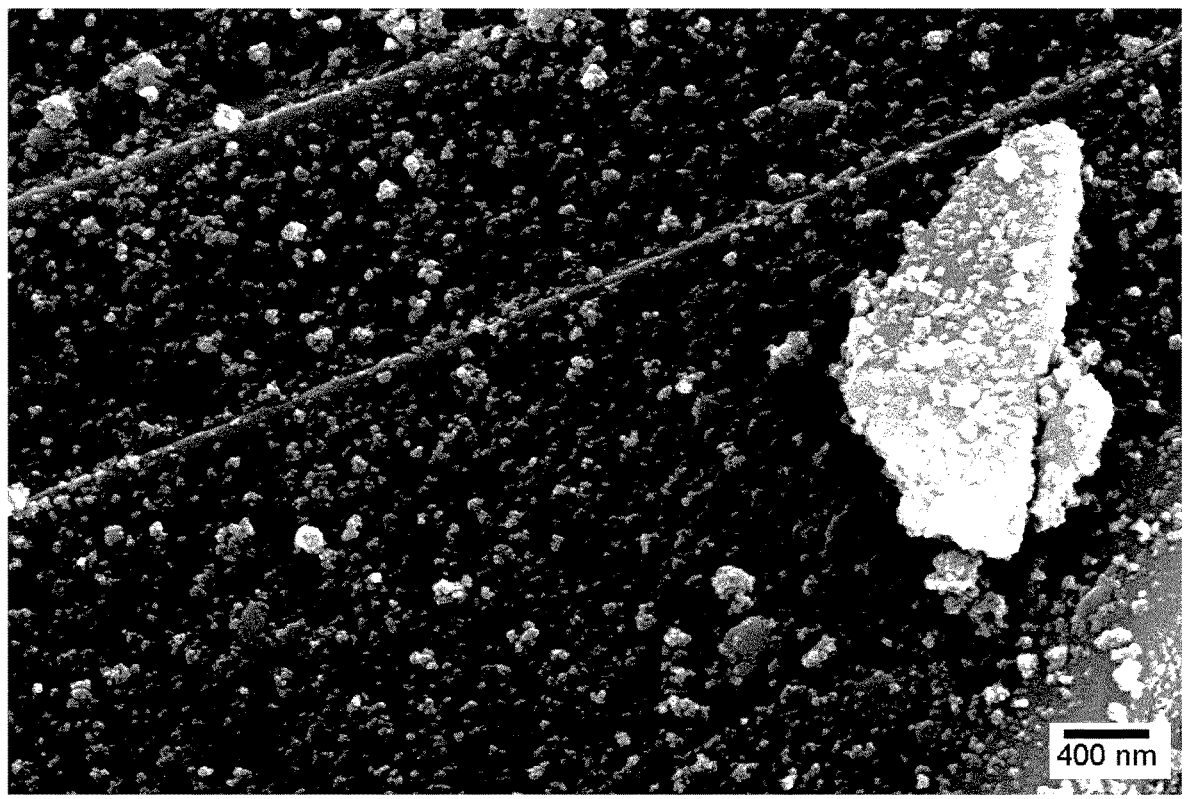
FIG. 12 is an image showing the spherical nanopowder uniformly dispersed and coated on a surface of the parent glass powder.
Figure 13:
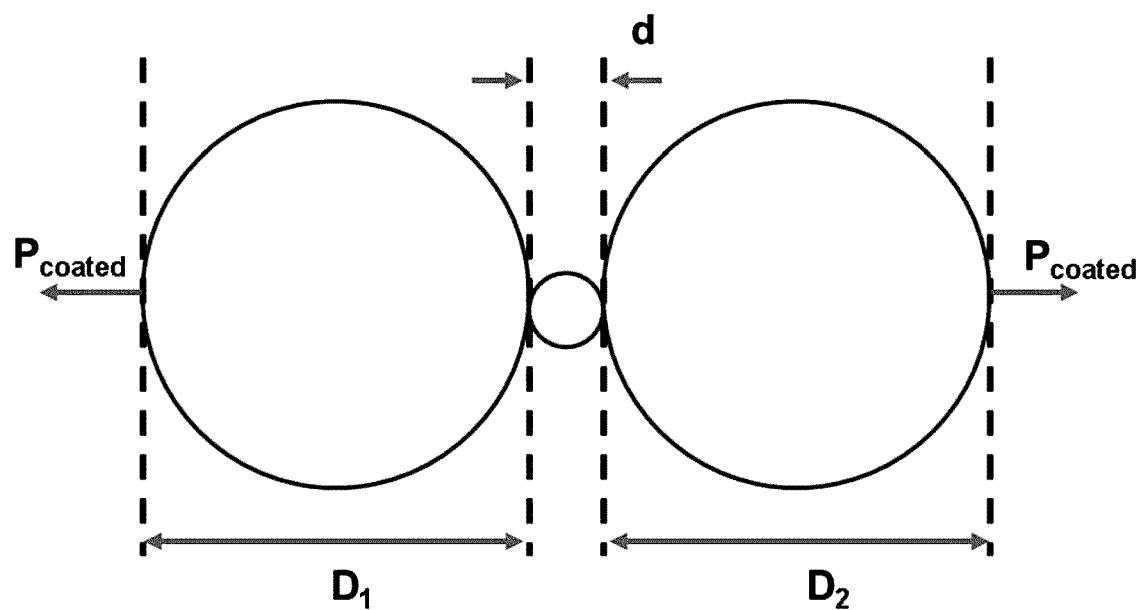
FIG. 13 is a schematic view for describing a phenomenon in which the spherical nanopowder reduces the cohesion of the parent glass powder particles by increasing the distance among the parent glass powder particles.

Such results are obtained because, when a parent glass powder and a spherical nanopowder are mixed together to a degree by which the spherical nanopowder can be uniformly dispersed and coated on a surface of the parent glass powder $P_{coated}$ as can be seen in FIG. 12 to be used as the forming material, the spherical nanopowder increases the distance (d) between parent glass powder particles as shown in FIG. 13, ultimately resulting in a reduced cohesive force among powder particles according to the equation provided below.

$$F=-AD_1D_2/(12d^2(D_1+D_2))$$

When $D_1=D_2$, $$F=-AD/(24d^2)$$

In addition, it is believed that the spherical nanopowder functioned as a rolling bearing among the parent glass powder particles, maximizing the flowability of the parent glass powder.

Although a preferred embodiment of the present invention has been described above, the present invention may encompass various changes, modifications, and equivalents. It is clear that a suitable modification of the above-described embodiment may be applied in the present invention. Therefore, the embodiment described above is not intended to limit the scope of the present invention defined by the scope of the appended claims.

What is claimed is:

1. A forming material for three-dimensional (3D) printing for formation of a 3D complex, the forming material consisting of:
    a parent glass powder in a form of an unmelted powder having an irregular shape by crushing amorphous glass; and
    a spherical nanopowder that has an average particle diameter equal to or less than $1/50^{th}$ of an average particle diameter of the parent glass powder and is mixed in such a way that the spherical nanopowder is disposed on a surface of the parent glass powder to enhance flowability of the parent glass powder having the irregular shape for physical formation of the 3D complex by 3D printing,
    wherein the average particle diameter of the parent glass powder is in a range of 1 to 200 μm, and the spherical nanopowder has an average particle diameter of 100 nm or less,
    wherein a material for the parent glass powder belongs to any one of a glass composition system having $SiO_2$ as a main component, a glass composition system having $Bi_2O_3$ as a main component, a glass composition system having $P_2O_5$ as a main component, a glass composition system having $V_2O_5$ as a main component, a glass composition system having PbO as a main component, and a glass composition system having $TeO_2$ as a main component,
    wherein a material for the spherical nanopowder belongs to any one of a glass composition system having $SiO_2$ as a main component, a glass composition system having $Bi_2O_3$ as a main component, a glass composition system having $P_2O_5$ as a main component, a glass composition system having $V_2O_5$ as a main component, a glass composition system having PbO as a main component, and a glass composition system having $TeO_2$ as a main component, or contains $SiO_2$, $Y_2O_3$, $Al_2O_3$, $TiO_2$, ZrO, NiO, CoO, $CeO_2$, MgO, CaO, $WO_3$, CuO, or $Fe_2O_3$ as a main component.

2. The forming material of claim 1, wherein a ratio of the average particle diameter of the spherical nanopowder to the parent glass powder is in a range of 1/200000 to 1/50.

3. The forming material of claim 1, wherein the parent glass powder is obtained by a method of crushing glass for a first time by ball milling to form coarse particles and then crushing the coarse particles for a second time by jet milling or ball milling to form fine particles.

4. The forming material of claim 1, wherein the spherical nanopowder is configured to have a glass transition temperature that is lower than a glass transition temperature of the parent glass powder such that the spherical nanopowder can promote sintering of the parent glass powder.

5. The forming material of claim 4, wherein a material for the spherical nanopowder is multicomponent oxide glass that belongs to any one of a glass composition system having $SiO_2$ as a main component, a glass composition system having $Bi_2O_3$ as a main component, a glass composition system having $P_2O_5$ as a main component, a glass composition system having $V_2O_5$ as a main component, a glass composition system having PbO as a main component, and a glass composition system having $TeO_2$ as a main component.

6. The forming material of claim 5, wherein the parent glass powder has an average particle diameter in a range of 1 to 200 μm, and the spherical nanopowder has an average particle diameter of 10 nm or less.

7. The forming material of claim 6, wherein the spherical nanopowder is also configured to be capable of enhancing a forming strength of the parent glass powder by containing a mixture of multicomponent oxide glass and a single oxide that is based on any one of $SiO_2$, $Y_2O_3$, $Al_2O_3$, $TiO_2$, ZrO, NiO, CoO, $CeO_2$, MgO, CaO, $WO_3$, CuO, and $Fe_2O_3$ and has an average particle diameter of 100 nm or less.

8. The forming material of claim 1, wherein the spherical nanopowder is configured to be capable of enhancing flowability and a forming strength of the parent glass powder by being based on any one of single oxides that do not react with the parent glass powder during sintering of the parent glass powder.

9. The forming material of claim 8, wherein the spherical nanopowder is a single oxide that is based on any one of $SiO_2$, $Y_2O_3$, $Al_2O_3$, $TiO_2$, $ZrO$, $NiO$, $CoO$, $CeO_2$, $MgO$, $CaO$, $WO_3$, $CuO$, and $Fe_2O_3$ and has an average particle diameter of 100 nm or less.

10. The forming material of claim 1, wherein the spherical nanopowder is coated, in a dispersed state, on a surface of the parent glass powder due to heat and static electricity.

11. The forming material of claim 4, wherein the spherical nanopowder is mixed in a ratio in a range of 0.01 vol. % to 1 vol. % of total materials.

* * * * *